G. H. HILL, DEC'D.
H. T. HILL, ADMINISTRATRIX.
IGNITION SYSTEM FOR INTERNAL COMBUSTION ENGINES.
APPLICATION FILED NOV. 5, 1917.
1,334,095. Patented Mar. 16, 1920.
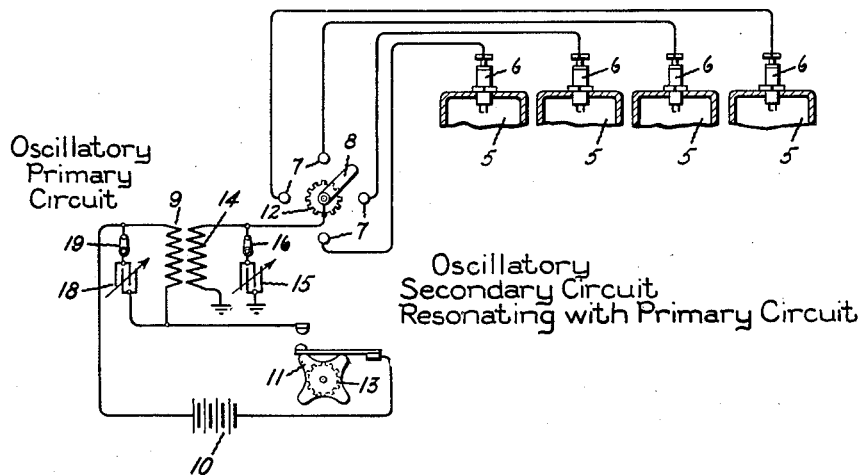
Inventor:
George H. Hill, Deceased,
Hazel T. Hill, Administratrix,
by
Attorney.

UNITED STATES PATENT OFFICE.

GEORGE H. HILL, DECEASED, LATE OF SCHENECTADY, NEW YORK, BY HAZEL T. HILL, ADMINISTRATRIX, OF SCHENECTADY, NEW YORK.

IGNITION SYSTEM FOR INTERNAL-COMBUSTION ENGINES.

1,334,095.  Specification of Letters Patent.  Patented Mar. 16, 1920.

Application filed November 5, 1917. Serial No. 200,435.

*To all whom it may concern:*

Be it known that GEORGE H. HILL, deceased, late of Schenectady, in the county of Schenectady and State of New York, during his lifetime invented certain new and useful Improvements in Ignition Systems for Internal-Combustion Engines, and that I, HAZEL T. HILL, administratrix of the estate of the said GEORGE H. HILL, deceased, do hereby declare, to the best of my knowledge and belief, that the following specification, taken in connection with the accompanying drawing, forming a part of the same, is a clear, true, and complete disclosure of said invention.

The invention relates to ignition systems for internal combustion engines and has for its object the provision of an improved arrangement of electrostatic capacity in an electric ignition system for such an engine. Another object of the invention is to increase the amount of electric energy available for sparking purposes in an electric ignition system of the ordinary type. Other objects of the invention will be brought out in the course of the following description.

The usual electric ignition system of an internal combustion engine includes a timing device and distributer for properly timing the sequence of the sparks in the various cylinders of the engine. Where the main source of electric energy for the ignition system is of low voltage, it is customary to transform this energy to electric energy of higher voltage by means of an induction coil or transformer. In accordance with one feature of the present invention, an electrostatic condenser is so associated with the distributer of such an electric ignition system that the condenser is electrically shunted across each spark plug at the instant the electric circuit of the spark plug is completed by the distributer for sparking operation, a single condenser being used in conjunction with any number of spark plugs. In ignition systems employing a voltage transforming device the distributer is of the high tension type and the condenser is electrically associated therewith in the secondary or high tension circuit of the system. The best results are obtained, that is the greatest volume of spark when the electrostatic capacity of the condenser resonates with the inductance of the spark circuit. By thus completely eliminating or neutralizing the inductance of the spark circuit the volume of the spark is greatly augmented as compared with that which is obtained by the usual arrangement.

Another feature of the invention comprises an organization by which a still greater volume of spark can be obtained in ignition systems employing a voltage transforming device by including electrostatic capacity in both the primary and secondary circuits thereof and proportioning the amounts of capacity included in these two circuits so that the two circuits are resonant with respect to one another. The addition of electrostatic capacity to both the primary and secondary circuits of such an ignition system makes each circuit oscillatory, since each circuit inherently contains a certain amount of inductance, and in accordance with this aspect of the present invention, the amounts of capacity which are included in the primary and secondary circuits of the ignition system are relatively proportioned so that the two oscillatory circuits are resonant. In other words, the inductance of these two circuits being fixed by the design of the apparatus, a certain amount of electrostatic capacity is associated with each circuit, whereby each circuit becomes oscillatory, and these two capacities are so proportioned with respect to the inductances of their respective circuits that the natural period of oscillation of the two circuits is substantially the same. The natural period of oscillation of an oscillatory circuit, or in other words the frequency of the oscillatory current flowing in such a circuit, is, assuming the pure ohmic resistance in such a circuit to be negligible, given by the equation.

$$N = \frac{1}{2\pi\sqrt{LC}}$$

where N represents the period or frequency, and L and C represent, respectively, the inductance and electrostatic capacity of the circuit. If, therefore, the inductance of the primary and secondary circuits of the ignition system are represented by $L_p$ and $L_s$, respectively, then, in accordance with the present invention, $C_p$ and $C_s$ units of electrostatic capacity are associated with the primary and secondary circuits, respectively, these units being so designed that $$L_p C_p = L_s C_s$$

In systems employing a main source of electric energy of pulsating character, the primary and secondary oscillatory circuits should resonate with the frequency of pulsations of the main source of energy. In other words, the amounts of capacity included in the primary and secondary circuits should in such a case be so proportioned that these circuits resonate with respect to the frequency of the main source, and this is accomplished by so proportioning $C_p$ and $C_s$ in the preceding equations that N is substantially equal to the frequency of pulsation of the main source of electric energy supply.

The novel features of the invention which are believed to be patentable are definitely set forth in the appended claims. The embodiment of the invention in the electric ignition system of an internal combustion engine will be understood from the following description taken in conjunction with the accompanying drawing, in which:

The figure is a diagrammatic view illustrating the application of the invention to a well known type of ignition system for a four cylinder gas engine.

In the figure of the drawing, there is represented four cylinders 5 of an internal combustion engine. Each cylinder has a spark plug 6. One terminal of each spark plug is electrically in contact with the metallic wall of the cylinder and is thus "grounded." The other terminal of each spark plug is insulatively mounted in the plug and is electrically connected to a stationary contact button 7 of a high tension distributer. The distributer has one contact button 7 for each spark plug. The distributer has a movable contact arm 8 which is adapted to be driven by the crank shaft of the engine, in the well understood manner, and consecutively and periodically engages the fixed contacts 7.

The ignition current may be supplied to the distributer in any of the well known ways, as for example, by a battery and its associated interrupter working through an induction coil or transformer. In the accompanying drawing, there is shown a step-up transformer having a primary winding 9 adapted to be connected to an electric battery 10 by means of a circuit making and breaking device 11. The make-and-break device 11 may be of any suitable design and in principle comprises a fixed contact periodically engaged by a movable contact whose motion may be controlled by the crank shaft of the engine. Gears 12 and 13 are shown in the drawing to indicate one way of operatively connecting the movable contacts of the distributer and make-and-break device to the crank shaft of the engine. The secondary winding 14 of the transformer has one terminal connected to the movable contact arm 8 of the distributer and has its other terminal grounded, that is, connected to the engine case.

The primary winding 9 of the transformer is shunted by an electrostatic condenser 18. A second electrostatic condenser 15 is connected in parallel with the secondary winding 14. Thus, one terminal of the condenser 15 is grounded while the other terminal is connected to the common terminal of the secondary winding 14 and the contact arm 8. The condensers 15 and 18 may each be adjustable. Ordinarily, however, it will only be desirable to adjust the capacity of the condenser 15, and in many cases it will be possible to predetermine the proper amounts of capacity of both condensers so that neither condenser need be adjustable. Where the ignition system embodies the present invention in its complete form, the electrostatic capacities of the condensers 18 and 15 will be proportioned so that the primary and secondary circuits are resonant.

The operation of the system shown in the drawing is as follows: As the movable contact arm 8 of the high tension distributer rotates, the electric circuits of the four spark plugs are consecutively and periodically completed in the usual manner. The condenser 15 is also consecutively connected in parallel with each spark plug during the time the electric circuit of the spark plug is completed. Each time the contacts of the make-and-break device 11 are closed and opened, a certain amount of electric energy is supplied by the battery 10 to the ignition system. A part of this energy is transferred to the secondary or spark circuit by transformer action and stored in part in the secondary condenser 15. Substantially simultaneously with the closing of the contacts of the make-and-break device 11, the movable arm 8 engages one of the contact buttons 7, and when the voltage across the secondary coil 14 and condenser 15 becomes high enough to break down the air gap between the contacts of the corresponding spark plug an oscillatory discharge takes place across these contacts. Due to the substantial neutralization of the inductance of the spark circuit by the condenser 15 this oscillatory discharge across the spark plug terminals is only very slightly damped, and consequently a relatively large number of oscillations of substantially the maximum amplitude pass across the gap of the spark plug. The volume of current passing across the contacts of the spark plug is thus materially increased as compared with previous systems. This action is consecutively and periodically repeated for each spark plug of the engine, and the single secondary condenser 15 is employed in conjunction with each and all of the spark plugs. The secondary condenser 15 is entirely independent of the other apparatus of the ignition system and can be constructed in accordance with the best known principles of condenser design, and can be conveniently made of as large capacity as is necessary to neutralize or resonate with the inductance of the spark circuit. An independent and separate condenser of this type may be conveniently applied to any standard ignition system, and if adjustable, its capacity can be very easily adjusted for resonance. The presence in the spark circuit of a condenser of the capacity herein contemplated not only increases the intensity and volume of the spark, but also, by neutralizing the inductance in this circuit, eliminates the danger of breakdowns due to abnormally high reactive voltages.

The amount of energy which is taken from the battery during the closing of the contacts of the make-and-break device 11 depends largely upon the amount of electric energy which can be stored in the ignition system. This energy may be stored in two forms, namely, as electro-magnetic energy and as electrostatic energy. Thus, electromagnetic energy will be stored by means of the inductance of the system, for example, that of the transformer 9—14, and electrostatic energy will be stored by means of the capacity of the system, for example, that of the condensers 18 and 15. The condensers thus provide a means for increasing the amount of electric energy that can be drawn from the battery 10 and temporarily stored in the system. As is well understood in the art, the condenser 18 and primary winding 9 form an oscillatory circuit, while the condenser 15 and secondary winding 14 form a second oscillatory circuit magnetically or inductively interlinked with the first. While these two oscillatory circuits need not be resonant in order to secure the advantages of a single condenser in the secondary circuit as previously described, the present invention in its complete aspect contemplates making the primary and secondary oscillatory circuits resonant with one another and with respect to the frequency of the primary current when the main source of energy is of a periodically pulsating character. Thus, the relative values of inductance and capacity in the two circuits will be determined in accordance with the equations hereinbefore recited. By making the primary and secondary circuits resonant, the energy stored in the primary circuit is transferred to the secondary circuit with minimum losses and a maximum amount of energy is available in the secondary circuit for sparking purposes.

The effect of the condenser 15 in the secondary circuit is to reduce the impedance of the spark circuit so that a greater amount of electric energy is available for the spark, and thereby the volume of the spark is increased. The maximum reduction in the impedance of the spark circuit is obtained when the inductance and capacity of the spark circuit resonate with respect to the sparking current. It will thus be seen from the foregoing description that in one aspect the present invention contemplates the use of a single electrostatic condenser in conjunction with any number of spark plugs for reducing the impedance of the spark circuit of each spark plug during the times of sparking. The invention further contemplates the use of such an amount of electrostatic capacity in the secondary circuit as to completely neutralize the inductance of the spark circuit, whereby the impedance of the spark circuit is reduced to a minimum. And in its complete aspect, the invention contemplates the use of electrostatic capacity in both the primary and secondary circuits of the ignition system and the proportioning of such capacities so that the primary and secondary circuits are resonant with one another, and with the primary source of energy provided the latter is pulsating, and thereby a relatively large amount of electric energy can be taken from the source and effectively and efficiently delivered in proper form for sparking purposes.

In some instances it may be desirable to make use of the features of the present invention only when starting the engine, and switches 16 and 19 may then be provided for disconnecting from the system either or both of the condensers 15 and 18, respectively. In actual practice, it will ordinarily be desirable to manipulate only the switch 16, since in the usual ignition system it is advantageous to permanently include a condenser in the primary circuit. Under such circumstances, the switch 19 may obviously be omitted. The switch 16, will, therefore, be closed at starting in order to obtain the very hot spark which results from the present arrangement of resonating primary and secondary oscillatory circuits, and when the engine has been satisfactorily started the switch 16 may be opened. Condensers of adjustable capacity have been illustrated in the drawing, and are of advantage in connection with the present invention because the capacity of such condensers may be conveniently adjusted until the condition of resonance is established. In practice, the operator may thus adjust the capacity of either or both of the condensers until the greatest volume of or most intense spark is obtained.

The invention is susceptible of being carried out in other ways than particularly described and illustrated herein, and various modifications of the arrangement herein particularly described will present themselves to those skilled in the art. It is the intention to cover by the following claims, therefore, all modifications within the spirit and scope of the invention.

What is claimed as new and desired to secure by Letters Patent of the United States, is,—

1. An ignition system for an internal combustion engine comprising in combination, a transformer having a primary winding and a secondary winding, a source of electric energy connected to said primary winding, a condenser associated with said primary winding to form a primary oscillatory circuit, a condenser associated with said secondary winding to form a secondary oscillatory circuit, the electrostatic capacities of said condensers being so proportioned that said primary and secondary oscillatory circuits are electrically resonant to the same frequency, a distributer having a movable contact and a plurality of stationary contacts operatively associated with said secondary circuit, and a plurality of spark plugs electrically connected to the stationary contacts of said distributer, one terminal of said condenser associated with said secondary winding being connected to the movable contact of said distributer and the other terminal being grounded.

2. An ignition system for an internal combustion engine having a plurality of cylinders comprising in combination, a spark plug for each cylinder, one terminal of each spark plug being grounded, a high tension distributer having a plurality of stationary contacts electrically connected to said spark plugs, and a movable contact arranged to consecutively complete the electric circuits of said spark plugs, a primary circuit containing inductance and capacity, a source of electric energy operatively related to said primary circuit, a secondary circuit inductively linked with said primary circuit and electrically related to said distributer, and a condenser having one of its terminals grounded and its other terminal electrically connected to the movable contact of said distributer, the capacity of said condenser being such that said secondary circuit resonates with said primary circuit.

3. An ignition system for an internal combustion engine comprising in combination, a primary circuit containing inductance and capacity, a secondary circuit inductively linked with said primary circuit and also containing inductance and capacity, the inductance and capacity of said secondary circuit being proportioned so that said secondary circuit resonates with said primary circuit, means for electrically disconnecting the capacity associated with said secondary circuit, a distributer operatively associated with said secondary circuit, and a plurality of spark plugs electrically connected to said distributer.

4. An ignition system for an internal combustion engine comprising in combination, a primary circuit, a source of electric energy therefor, a secondary circuit inductively linked with said primary circuit, a condenser electrically associated with each of said circuits, the electrostatic capacities of said condensers being such that said circuits are resonant, means for at will electrically disconnecting the condenser associated with said secondary circuit, a distributer operatively associated with said secondary circuit, and a plurality of spark plugs electrically connected to said distributer.

In witness whereof, I have hereunto set my hand this 1st November, 1917.

HAZEL T. HILL,
*Administratrix of George H. Hill, deceased.*